United States Patent [19]

Tsunekawa et al.

[11] Patent Number: 4,587,415

[45] Date of Patent: May 6, 1986

[54] PHOTO-DETECTING DEVICE WITH STORAGE TIME CONTROL

[75] Inventors: Tokuichi Tsunekawa; Shinji Sakai, both of Kanagawa; Takao Kinoshita, Tokyo, all of Japan

[73] Assignee: Canon Kabushiki Kaisha, Tokyo, Japan

[21] Appl. No.: 516,115

[22] Filed: Jul. 20, 1983

[30] Foreign Application Priority Data

Jul. 23, 1982 [JP] Japan ................. 57-128549
Jul. 23, 1982 [JP] Japan ................. 57-128550
Dec. 29, 1982 [JP] Japan ................. 57-231511

[51] Int. Cl.$^4$ ............................................. G01J 1/36
[52] U.S. Cl. ................................... 250/204; 250/578
[58] Field of Search .............. 250/578, 211 J, 204, 250/209, 201, 214 R, 214 SF; 358/212, 213; 357/24 LR, 30, 31, 32

[56] References Cited

U.S. PATENT DOCUMENTS

| | | | |
|---|---|---|---|
| 3,934,161 | 1/1976 | Caywood | 358/213 |
| 3,944,816 | 3/1976 | Harada | 357/24 |
| 4,125,766 | 11/1978 | Holtje | 250/214 SF |
| 4,280,141 | 7/1981 | McCann et al. | 358/213 |
| 4,340,819 | 7/1982 | Ogasawara et al. | 250/578 |
| 4,399,464 | 8/1983 | Hix et al. | 358/213 |
| 4,479,062 | 10/1984 | Kawasaki et al. | 250/578 |

Primary Examiner—David C. Nelms
Attorney, Agent, or Firm—Toren, McGeady, Stanger, Goldberg & Kiel

[57] ABSTRACT

A photo-detecting device employed for photo-detecting a storage type photo-sensor which produces information stored therein according to light inputs on the form of signals integrated in a real time and nondestructive manner. Timing for reading out the output of the photo-detecting apparatus by a control circuit which controls on the basis of the output of the photo-detecting apparatus is to be determined according to the output of the photo-detecting apparatus when the photo-detecting means stores information corresponding to the light inputs. A period of time after storage is started by the photo-detecting means and before the information is read out by the control circuit is determined during the process of storing the information.

8 Claims, 10 Drawing Figures

PHOTO-DETECTING DEVICE WITH STORAGE TIME CONTROL

BACKGROUND OF THE INVENTION

1. Field of the Invention

This invention relates to a photo-detecting device and more particularly to a device employing a storage type photo-sensor in which information stored according to light inputs is produced in the form of signals integrated in a real time and nondestructive manner.

2. Description of the Prior Art

Generally a storage type sensor storing an input signal such as information on light or the like becomes incapable of accurately detecting the signal amount received due to noises or the like under a condition where only a small input signal is stored. This necessitates continuous storing of information by the sensor at least until the signal amount stored at the sensor becomes detectable. In the meantime, control and processing circuits, etc. must be kept from using the output of the sensor.

In conventional practice, this problem is solved by repeatingly reading out the storage signal of the sensor and a length of time required before the storage signal of the sensor reaches a prescribed level is precalculated from a storage amount obtained for a certain storing time during the repeated read-out process. Whether or not the signal storage amount of the sensor has reached a detectable range is thus determined in a trial-and-error manner. In another conventional practice, an intensity detecting sensor is provided in addition to a storage type sensor for detecting the intensity of the signal of a photo-diode or the like; and whether or not the storage signal of the storage type sensor has reached a detectable range is determined on the basis of the output of the intensity detecting sensor.

However, it is a shortcoming of the former conventional practice that the signal must be repeatedly stored at the sensor before an adequate storage time is determined. Therefore, a long time is required for measurement. A shortcoming of the latter method, on the other hand, is that the signal storage amount of the storage type sensor cannot be accurately detected due to the positional difference between the storage type sensor and the intensity detecting sensor.

It is therefore an object of the present invention to provide a photo-detecting device wherein there is provided at least one photo-detecting means which includes a storage type photo-sensor producing information stored therein according to light inputs in the form of signals integrated in real time and in a nondestructive manner. The storage time of the photo-detecting means can be accurately determined in a short period of time.

It is another object of the invention to provide a photo-detecting device which is capable of detecting brightness from the output of the above photo-detecting means with an extremely simplified structural arrangement.

It is a further object of the invention to provide a photo-detecting device which is capable of stopping flash means from flashing by virtue of the output of the above photo-detecting means.

These and other objects and features of the invention will be apparent from the following detailed description of preferred embodiments thereof taken in conjunction with the accompanying drawings.

SUMMARY OF THE INVENTION

These and other objects of the invention are attained in a photo-detecting device which includes photo-detecting means including a storage type photo-sensor arranged to produce information stored therein according to light inputs in the form of signals integrated in a real time and nondestructive manner. The apparatus also includes driving means for driving a photo-detecting means to begin to store information according to incident light as well as differentiating means for time differentiating the output of the photo-detecting means according to the information stored after the lapse of a predetermined period of time from the commencement of storing by the photo-detecting means. The differentiating means is arranged to hold a value obtained through the time differentiation. The apparatus also includes determining means for determining a timing for reading out stored information from the photo-detecting means on the basis of the output of the differentiating means in addition to switching means arranged to permit reading out of the stored information of the photo-detecting means according to the output of the determining means.

DETAILED DESCRIPTION OF PREFERRED EMBODIMENTS

Figure 1:
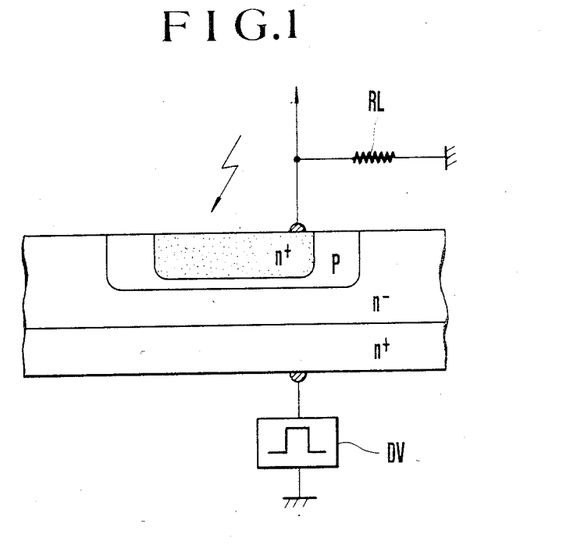
FIG. 1 is a plan view showing, by way of example, a static induction transistor usable in accordance with the present invention.

FIG. 1 schematically shows the structural arrangement of a static induction transistor (hereinafter called the SIT) photo-sensor. The SIT photo-sensor consists of an $n^-$ layer, a p layer and an $n^+$ layer which are formed on a silicone base plate forming an $n^+$ layer. A light flux incident upon the $n^+$ layer which serves as a photo-sensitive layer forms electron pairs in conjunction with holes. As a result the holes are accumulated in the p layer. The accumulation of holes in the p layer is proportional to the intensity of the incident light and forms the electric potential of the base of the photo-transistor. A photo-electric conversion output signal is obtained on the basis of this base potential via a load resistance RL. A reference symbol DV identifies a driving circuit provided for the SIT photo-sensor. When the driving circuit DV produces a high level output, storing and reading out actions on light information are in process. Meanwhile, when the driving circuit DV output is at a low level, the holes are cleared. In other words, picture image information can be read out without damage as often as desired when the driving circuit DV is at a high level.

Figure 2:
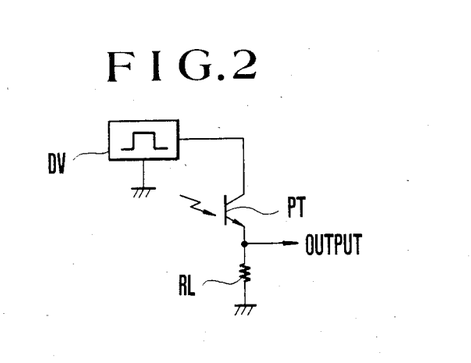
FIG. 2 is a circuit diagram showing an equivalent circuit relative to the static induction transistor shown in FIG. 1.

FIG. 2 shows an equivalent circuit of the SIT photo-sensor of FIG. 1. In FIG. 2, a symbol PT identifies a photo-sensor of the SIT structure.

Figure 3:
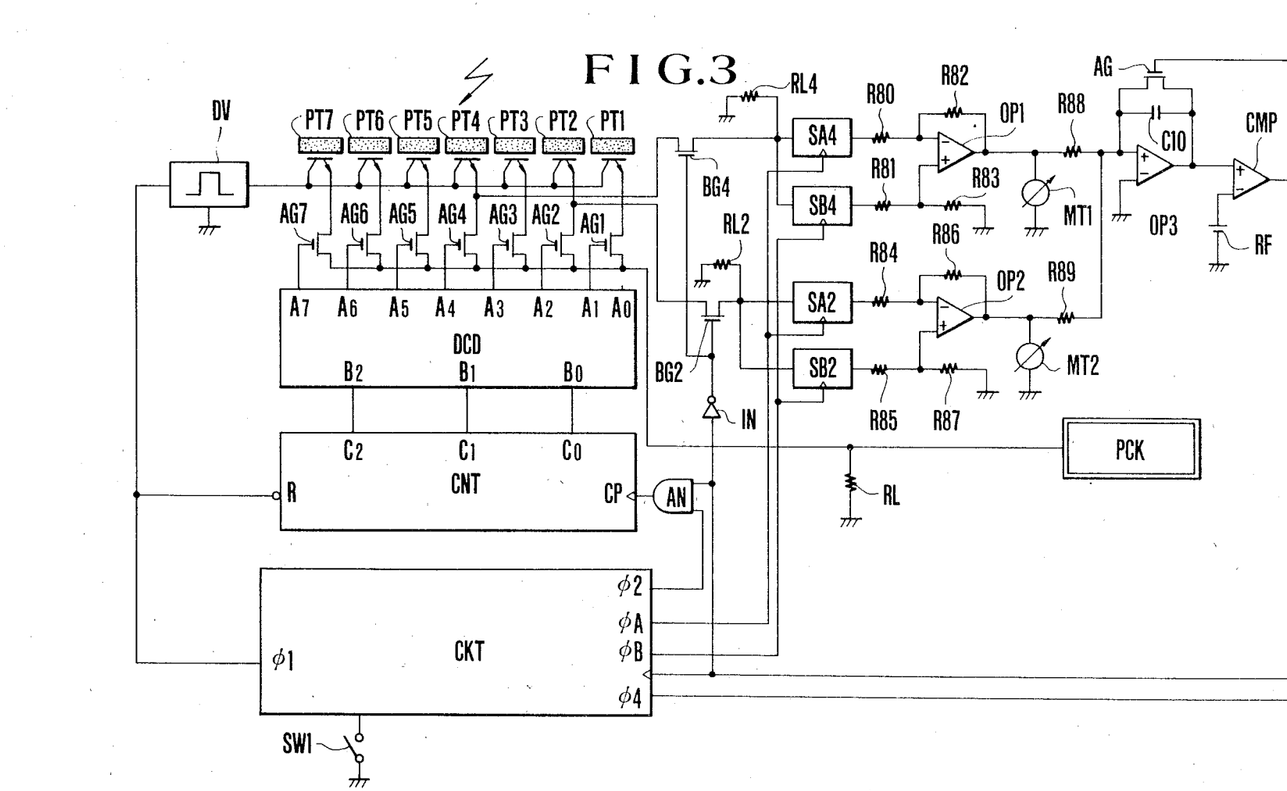
FIG. 3 is a circuit diagram showing a photo-detecting device in an embodiment of the invention.

FIG. 3 is a circuit diagram showing the electric circuit arrangement of an embodiment of the invention, wherein storage type photo-sensors PT1–PT7 capable of nondestructively reading out, are in a row. The brightness of the surfaces of these sensors is detected and the storage time is determined on the basis of the brightness thus detected. The circuit arrangement includes the photo-sensors PT1–PT7 of the SIT structure; switching gates AG1–AG7, which are provided for signal read-out and are controlled by a decoder driver DCD; a counter CNT for controlling the decoder driver DCD; a pulse control circuit CKT; gates BG2 and BG4 for detecting the outputs of the photo-sensors PT2 and PT4; load resistances RL, RL2 and RL4 for signal read-out; and an inverter IN for transmitting the output of a comparator CMP to the gates BG2 and BG4 by inverting it; sample-and-hold circuits SA2, SA4, SB2 and SB4; operation resistors R80–R88; operational amplifiers OP1–OP3; indicators MT1 and MT2 which display information on the brightness of light incident upon the photo-sensors PT2 and PT4 and operate which in response to variations in the outputs of the operational amplifiers OP1 and OP2; an integrating capacitor C10 for determining storage time; a reset gate AG which resets the integrating charge of the capacitor C10; the above comparator CMP; a reference voltage RF; an AND gate AN; a signal processing circuit PCK which operates in the next step by reading out the stored information of the photo-sensors PT1–PT7 via the switching gates AG1–AG7; and a switch SW1 for starting the pulse control circuit CKT.

Figure 4:
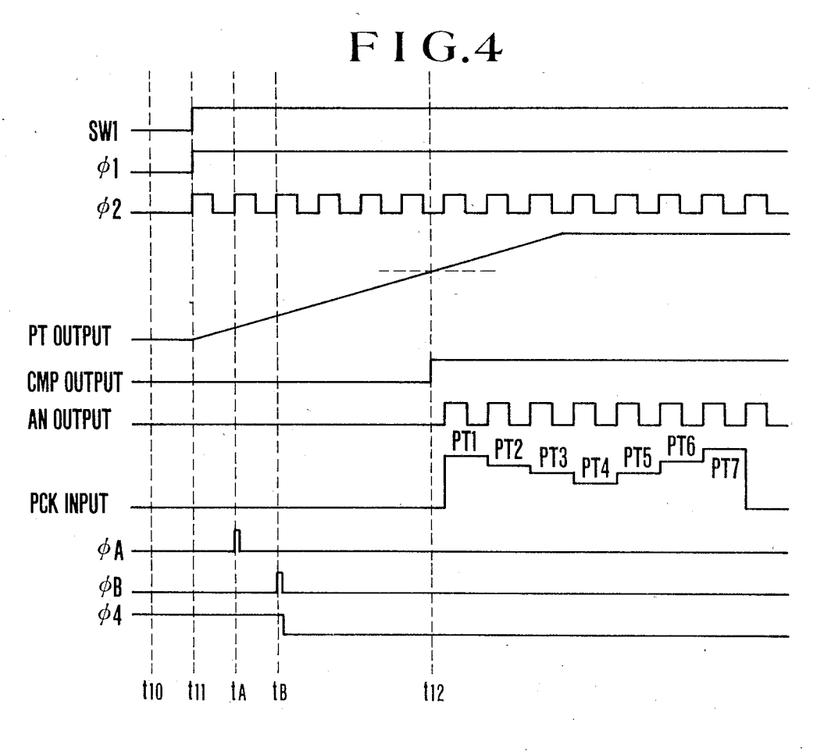
FIG. 4 is a timing chart of the operation of the embodiment shown in FIG. 3.

FIG. 4 is a timing chart showing the operations of the essential parts of the embodiment shown in FIG. 3. Referring to FIG. 4, the embodiment operates as follows: The output terminal $\phi 1$ of the pulse control circuit CKT is at a low level at a time t10. At that time, the output of the SIT driving circuit is also at a low level. Information on light (a picture image), which has been unnecessarily stored at the photo-sensors PT1–PT7, is cleared. Meanwhile, the counter CNT is also reset. When the switch SW1 turns on at a time t11, the level of output terminal $\phi 1$ becomes high and that of the driving circuit DV also becomes high. Therefore, the photo-sensors PT1–PT7 begin to store light information. At that instant, the counter CNT is also released from reset. However, since the comparator CNP output level is low and the AND gate AN remains closed at that time, the counter CNT is unable to count reference clock pulses produced from the terminal $\phi 2$ of the pulse control circuit CKT. Under this condition, the levels of all the output terminals C0–C2 of the counter CNT are at low levels. At the decoder driver DCD, the level of the terminal A0 of the decoder driver DCD alone is at a high level. All the analog gates AG1–AG7 are off. At that moment, the output level of the inverter IN becomes high. Therefore, the gates BG2 and BG4 turn on. The outputs of the photo-sensors PT2 and PT4 are constantly read out via the load resistances RL2 and RL4. When sampling pulses for time differentiating the outputs of the photo-sensors PT2 and PT4 are produced from the output terminals $\phi A$ and $\phi B$ of the pulse control circuit CKT at the times tA and tB, the signals produced from the photo-sensors PT2 and PT4 at the different times are held at the sample-and-hold circuits SA2, SB2, SA4 and SB4. More specifically, the output of the photo-sensor PT2 produced at the time tA is held at the sample-and-hold circuit SA2. The output of the photo-sensor PT2 produced at the time tB is held at the circuit SB2. The output of the photo-sensor PT4 produced at the time tA is held at the circuit SA4 while the output of the photo-sensor PT4 produced at the time tB is held at the circuit SB4. Then the differential amplifier consisting of the resistors R80–R87 and the operational amplifiers OP1 and OP2 subtracts the signal held at the time tA from the signal held at the time tB. In other words, the difference between the output of the sample-and-hold circuit SB2 and that of the sample-and-hold circuit SA2 is produced from the operational amplifier OP2. Meanwhile, the difference between the output of the sample-and-hold circuit SB4 and that of the sample-and-hold circuit SA4 is produced from the operational amplifier OP1. The outputs of the operational amplifiers OP1 and OP2 are applied to the indicators MT1 and MT2. Then, the indicators MT1 and MT2 respectively display information on average brightness values of the light fluxes incident upon the photo-sensors PT4 and PT2 obtained during a period between the times tA and tB. In this particular embodiment, meters are employed as the indicators MT1 and MT2. However, these meters may be replaced with any indicators MT1 and MT2 that are capable of varying their displays in response to output variations of the operational amplifiers OP1 and OP2. Furthermore, the outputs of the two photo-sensors PT2 and PT4 are time differentiated in this embodiment. However, this arrangement may be replaced with an arrangement to time differentiate the outputs of more than three photo-sensors.

Next, in synchronization with the fall of a sample-and-hold pulse produced from the terminal $\phi B$ of the pulse control circuit CKT at the time tB, the output level of another terminal $\phi 4$ of the pulse control circuit CKT changes from high to low turning off the reset gate AG. The capacitor C10 then integrates the sum of the outputs of the operational amplifiers OP1 and OP2. In other words, at this instant, time integration begins, determining the storage time of the photo-sensors PT1–PT7. When the output of the operational amplifier OP3 based on the integration value of the capacitor C10 exceeds the reference voltage RF at a time t12, the output of the comparator CMP changes to a high level. This causes the detection gates BG2 and BG4 to turn off via the inverter IN. Then, the AND gate AN opens. The counter CNT begins to count reference clock pulses produced from the terminal $\phi 2$ of the pulse control circuit CKT. The outputs of the output terminals C0–C2 of the counter CNT vary according to the value thus obtained. As a result, the output levels of terminals A1–A7 of the decoder driver DCD become high one after another turning on the analog gates AG1–AG7 one after another at predetermined intervals. The outputs of the photo-sensors PT1–PT7 are time serially supplied, one after another, to the signal processing circuit PCK via the load resistance RL. The outputs of the photo-sensors PT1–PT7, which have been thus read out, are signal processed by the signal processing circuit PCK for operation of the next stage. A further light information storing process can be stopped during the image information reading process by setting the output level of the driving circuit DV at a suitable voltage level based on inversion of the storage time determining comparator CMP. Furthermore, it is also possible to determine the storage time by weighting the outputs of the brightness detecting photo-sensors PT2 and PT4 by adjusting the values of the operation resistors R88 and R89 provided for computing to suitable set values the outputs of the operational amplifiers OP1 and OP2.

Figure 5:
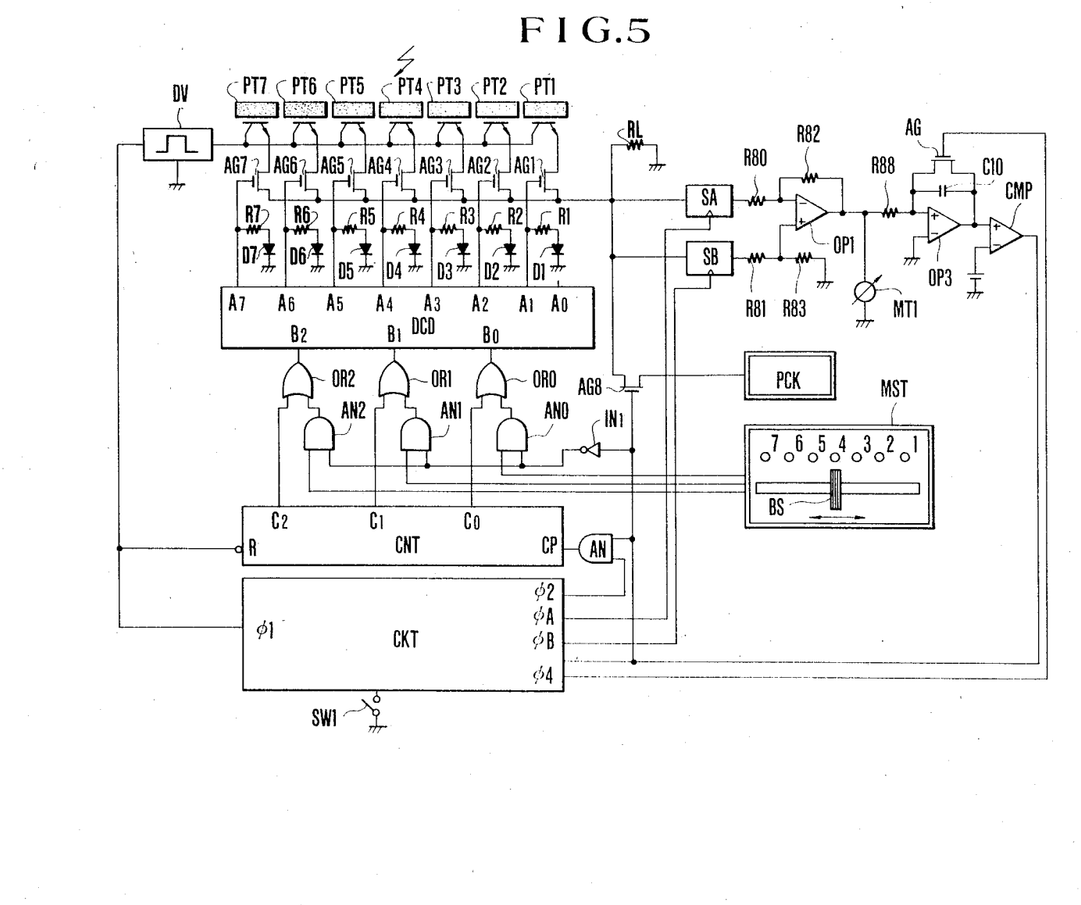
FIG. 5 is a circuit diagram of a modification of the embodiment shown in FIG. 3.

A modification of this embodiment of the invention is shown in FIG. 5. In this instance, the brightness detecting photo-sensors PT1–PT7 are set as desired by operating a setting lever BS of photo-sensor selecting means MST.

Referring to FIG. 5, the modification includes two-input type OR gates OR0–OR2 which are disposed in the transmission lines between the counter CNT and the decoder DCD. Each of the output terminals C0–C2 of the counter CNT is connected to one of input terminals of the OR gates OR0–OR2 while the output terminals of AND gates AN0 to AN2 are connected to the other input terminals. The selecting means MST is provided for selecting a brightness detecting photo-sensors from out of the photo-sensors PT1–PT7. The selecting means MST produces and supplies to the AND gates AN0–AN2 a signal for reading out a signal from each photo-sensor selected by operating the setting lever BS. For example, with the setting lever BS set at a "4" as shown in FIG. 5, a signal which is similar to the signal produced from the terminals C0–C2 of the counter CNT, is produced to turning on the switching gate AG4. The switching gate AG4 is thus turned on. The output terminal of the comparator CMP is connected via the inverter IN1 to one input terminal of each of the AND gates AN0–AN2. The output terminal of the comparator CMP is also connected to the analog gate AG8. Light emitting display elements D1–D7 are connected to the output terminals A1–A7 of the decoder DCD via current limiting resistors R1–R7. The light emitting display elements light up indicating the photo-sensors PT1–PT7 selected for brightness detection when the output level of each of the output terminals A1–A7 becomes high.

With the setting lever BS set at 4 as shown in FIG. 5, the embodiment operates as follows: When a storing operation begins depending on the light incident on the photo-sensors PT1–PT7 with the switch SW1, the output level of the comparator CMP is low. Therefore, the AND gate AN is closed inhibiting the counter CNT from counting the reference clock pulses $\phi2$. Meanwhile the AND gates AN0–AN2 are opened via the inverter IN1 transmitting the signal from the selecting means MST to the OR gates OR0–OR2. As a result, the output level A4 of the decoder DCD becomes high causing the element D4 to light up. The switching gate AG4 turns on producing the storage signal of the photo-sensor PT4. Then, in the same manner as in the preceding embodiment, the output of the photo-sensor PT4 is held respectively by the sample-and-hold circuits SA and SB when the output $\phi A$ of the pulse control circuit CKT is produced at the time tA and the output $\phi B$ at the time tB. Furthermore, since the analog gate AG8 is off at that time, the output of the photo-sensor PT4 is not transmitted to the signal processing circuit PCK.

Then, the capacitor C10 performs an integrating action based on the difference between the outputs held by the sample-and-hold circuits SA and SB. When the output of the comparator CMP changes to a high level, the AND gate AN produces a pulse signal synchronized with the reference clock pulse output $\phi2$ of the pulse control circuit CKT. The output levels of the AND gates AN0–AN2 become low and the analog gate AG8 turns on. Therefore, the ensuing operation is identical with the preceding embodiment.

Figure 6:
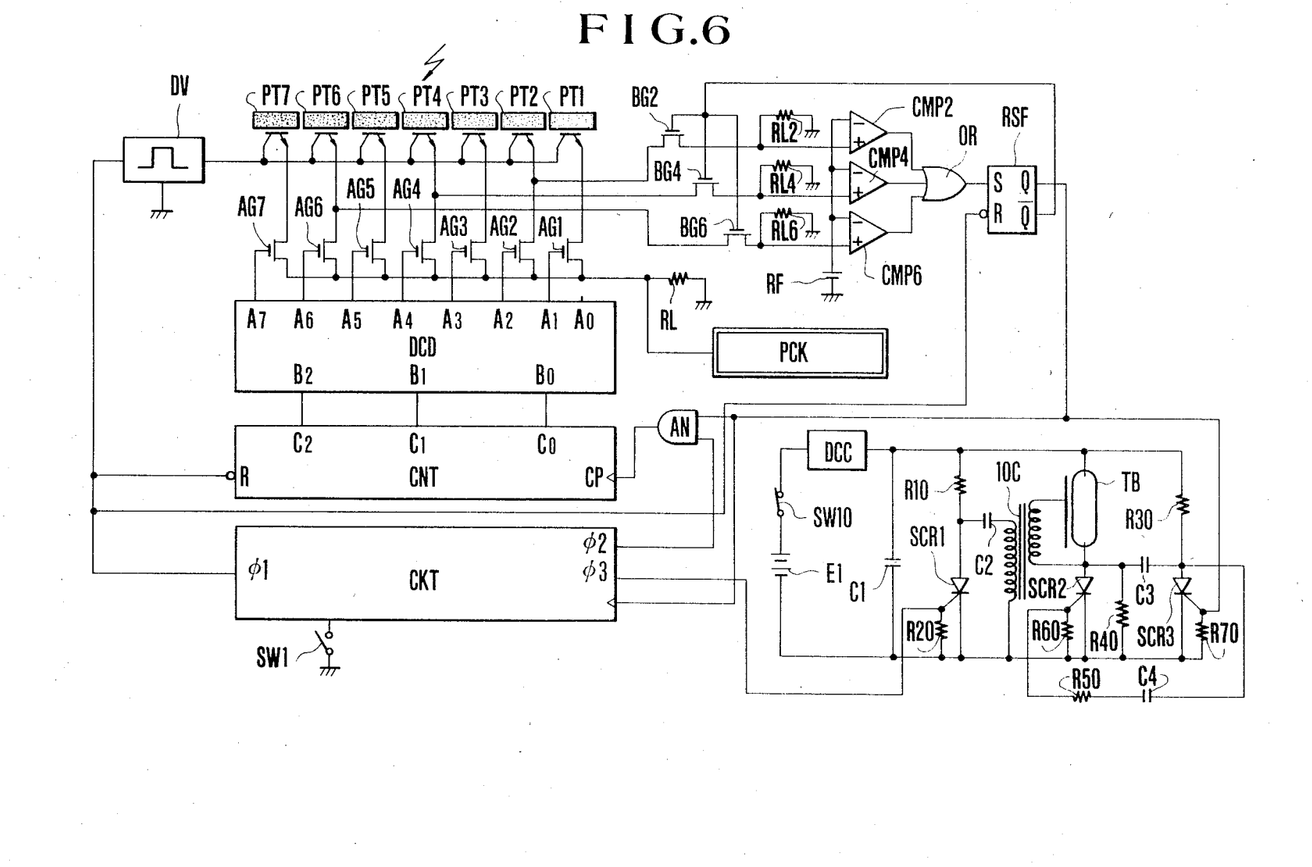
FIG. 6 is a circuit diagram showing another embodiment of the invention.
Figure 7:
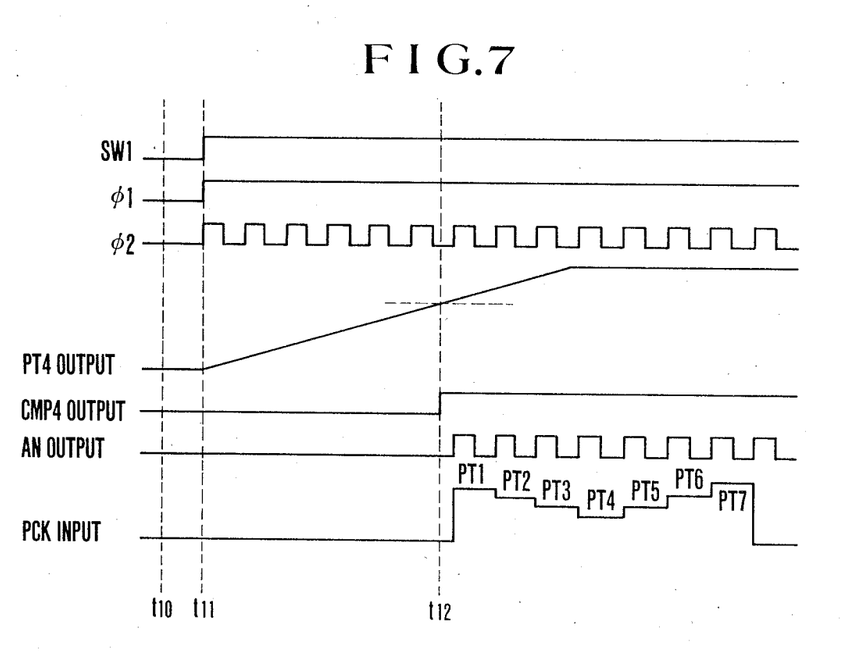
FIG. 7 is a timing chart showing the operation of the embodiment shown in FIG. 6.

FIG. 6 shows another embodiment of an electric circuit arrangement in which the storage type photo-sensors PT1–PT7 capable of nondestructive read out, are arranged in a row having the storage time controlled in a real time manner. In FIG. 6, reference symbols PT1–PT7 identify the photo-sensors of the SIT structure; reference symbols AG1–AG7 identify switching gates AG1–AG7, which are controlled by the decoder dirver DCD for reading out signals. The circuit arrangement further includes the counter CNT for controlling the decoder driver DCD; the pulse control circuit CKT; the gates BG2, BG4 and gate BG6 for constantly detecting the outputs of the photo-sensors PT2, PT4 and PT6; the load resistances RL2, RL4 and load resistance RL6 which are connected to the gates BG2, BG4 and BG6 are provided for signal read-out; comparators CMP2, CMP4 and CMP6; an OR gate OR; an RS flip-flop RSF; the AND gate AN; the signal processing circuit PCK; and the circuit start control switch SW1. The timing of the essential parts of the embodiment shown in FIG. 6 is as shown in FIG. 7. Referring to FIG. 7, details of the operation of the embodiment shown in FIG. 6 are as follows: At a time t10, the output $\phi1$ of the pulse control circuit CKT is at a low level and the the SIT driving circuit DV output has also been changed to a low level. Accordingly, unnecessary information on light (a picture image) previously stored at the SIT structure photo-sensors PT1–PT7 is cleared. Meanwhile, the counter CNT and the RS flip-flop RSF have also been reset. When the switch SW1 turns on at the time t11, the output level $\phi1$ of the pulse control circuit CKT becomes high. Then, the output level of the driving circuit DV becomes high. As a result, each of the photo-sensors PT1–PT7 begins to store light information depending on the brightness of the light incident thereon. However, a terminal Q of the flip-flop RSF is at that moment at a low level. Therefore, the AND gate AN does not allow the reference clock pulses $\phi2$ to be supplied to the counter CNT. Accordingly, all the output terminals C0–C2 of the counter CNT are at a low level. Meanwhile, at the decoder driver DCD, only the level of the terminal A0 becomes high. All the analog gates AG1–AG7 are off. None of the outputs of the photo-sensors PT1–PT7 are transmitted to the signal processing circuit PCK. The terminal Q of the flip-flop RSF, on the other hand, is at a high level turning on the gates BG2, BG4 and BG6. Therefore, outputs of the photo-sensors PT2, PT4 and PT6 are read out via the constant load resistances RL2, RL4 and RL6. At a time t12, if, for example, the output of the photo-sensor PT4 exceeds the reference voltage RF earlier than those of the photo-sensors PT2 and PT6, the comparator CMP4 output level becomes high setting the RS flip-flop RSF via the OR gate OR. Then, the gates BG2–BG6 turn off and the reference clock pulses $\phi2$ enter the counter CNT via the AND gate AN. The decoder driver DCD then turns on the analog gates AG1–AG7, one after another. As a result, the outputs of the photo-sensors PT1–PT7 are time serially read out via the load resistance RL and are signal processed at the signal processing circuit PCK.

A further light information storing process can be stopped during the picture image information reading process by setting the output level of the driving circuit DV to a given suitable voltage level on the basis of the output of the OR gate OR, which produces an output indicating that the constant signal detecting photo-sensor output has reached a predetermined value. It is also possible to have the output of the constant signal detecting photo-sensor weighted by adjusting the set values of the load resistances RL2, RL4 and RL6. Furthermore, an arrangement allowing a flash device to flash in in synchronization with the operation of the switch SW1 will enable flashing of the flash device depending on the constant signal detecting photo-sensor output.

A flash device of the automatic light control type is arranged as follows: Referring to FIG. 6, when a switch SW10 turns on, a known booster circuit DCC is actuated by a power source battery E1. A main capacitor C1 of the flash device is then charged to a sufficient voltage for flash photo-graphy. Meanwhile, commutating capacitors C2 and C3, which are provided for triggering an automatic light control, are also charged via resistors R10, R20 and R40. When pulses are produced from the output terminal $\phi 3$ of the pulse control circuit CKT in association with operation of the switch SW1, a triggering SCR1 turns on impressing a high voltage on a flash light discharge tube TB by the capacitor C2 and a trigger coil IDC, and the flashing begins. When one of the outputs of the constant signal detecting photo-sensors PT2, PT4 and PT6 reaches a predetermined value, the output level of the terminal Q of the RS flip-flop RSF becomes high turning on a light controlling SCR3. Then, a flash control circuit consisting of an SCR2, resistors R30–R60 and capacitors C3 and C4 operates ending the flashing action of the flash device.

Figure 8:
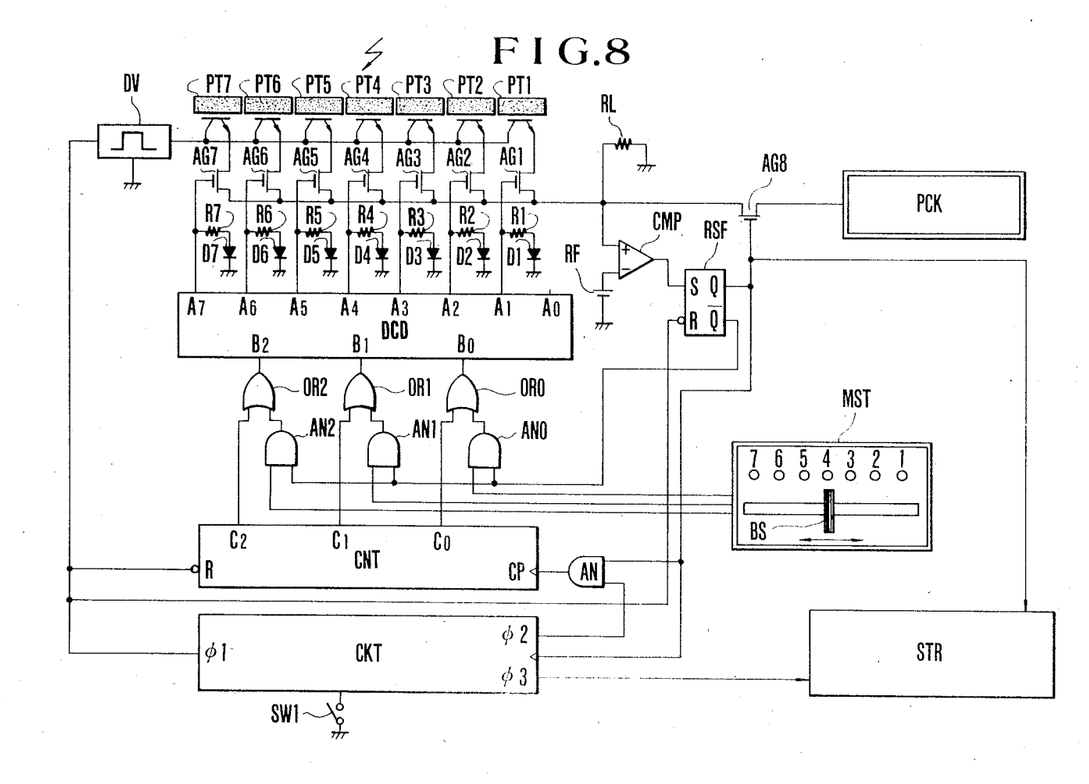
FIG. 8 is a circuit diagram of a modification of the embodiment shown in FIG. 6.

FIG. 8 shows a variation of this embodiment. In this case, the constant signal detecting photo-sensors PT1–PT7 are set as desired by setting the setting lever BS of the photo-sensor selection means MST. An output terminal $\overline{Q}$ of the flip-flop RSF is connected to one of the input terminals of each of the AND gates AN0–AN2. The output terminal Q of the flip-flop RSF is connected to the analog gate AG8. With the exception of these points, the variation shown in FIG. 8 is in exactly the same as the embodiment shown in FIG. 5. The operation of the former is similar to that of the latter and thus does not require further description. Furthermore, in FIG. 8, a block STR identifies a circuit which is similar to the flash device circuit shown in FIG. 6.

Figure 9:
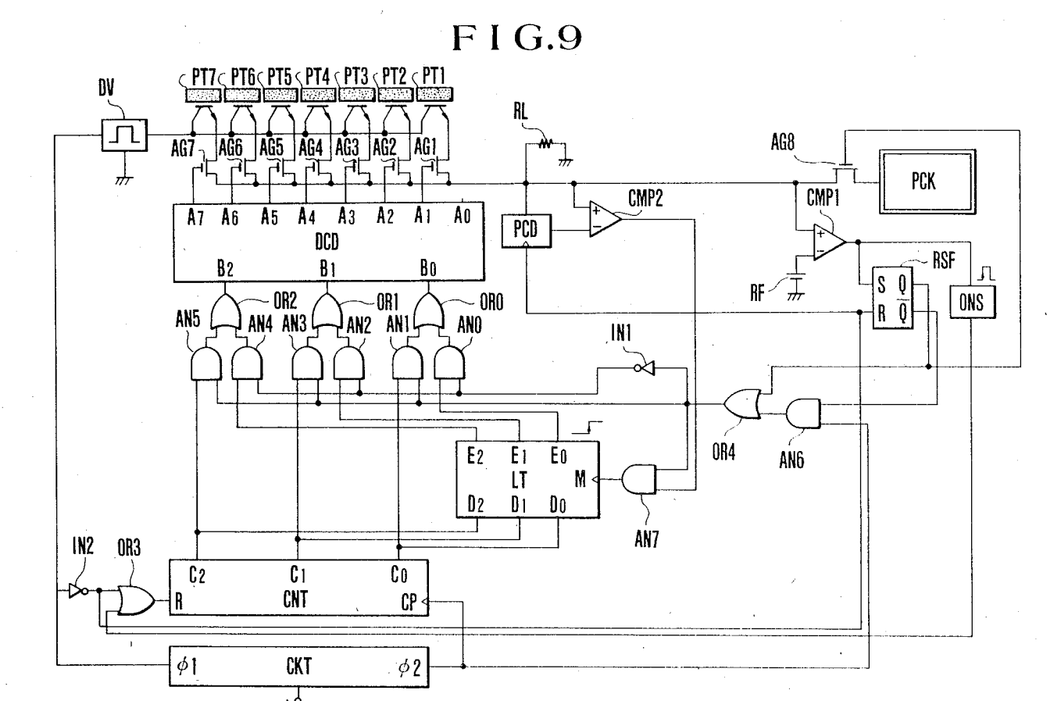
FIG. 9 is a circuit diagram showing another embodiment of the invention.

FIG. 9 shows an electric circuit arrangement of another embodiment of the invention. In this embodiment, the invented storage type photo-sensors PT1–PT7, which are capable of nondestructive read out, are in a row and the storage time is controlled in a real time manner. Referring to FIG. 9, the pulse control circuit CKT produces a high level signal from an output terminal $\phi 1$ thereof when the switch SW1 closes and, at the same time, produces reference clock pulses from an output terminal $\phi 2$ thereof. The high level signal from the output terminal $\phi 1$ of the pulse control circuit CKT is inverted by the inverter IN2. This inverted signal then releases the counter CNT from reset by entering the counter CNT via an OR gate OR3. With the counter CNT released from reset, the counter CNT begins to count clock pulses supplied to an input terminal CP thereof. The counter CNT then produces from its output terminals C0, C1 and C2 signals corresponding to numbers of clock pulses counted. When the output level of a comparator CMP is low and the RS flip-flop RSF is not set, these signals from the counter CNT are supplied to input terminals B0, B1 and B2 of the decoder DCD via the AND gates AN1, AND gates AN3 and AN5 and the OR gates OR0, OR1 and OR2 synchronized with clock pulses $\phi 2$ via an AND gate AN6. The decoder DCD, therefore, produces high level signals from its output terminals A1–A7 opening gates AG1–AG7, one after another, in synchronization with the clock pulses $\phi 2$. In other words, sensor signal read-out means is formed jointly by the pulse control circuit CKT, the counter CNT, the decoder DCD, the gates AG1–AG7, etc. Photo-sensors PT1–PT7 of the SIT structure permit nondestructive read-out of light information stored. When a high level signal produced from the output terminal $\phi 1$ of the pulse control circuit CKT causes a driving circuit DV provided for the photo-sensors PT1–PT7 to produce a high level output, the photo-sensors PT1–PT7 begin to store light information depending on the brightness of light incident thereon. Accordingly, when any of the gates AG1–AG7 opens, the light information stored at the photo-sensors PT1–PT7 corresponding to the open gate is subjected to photoelectric conversion and is nondestructively read out. A peak detection circuit PCD is connected to the output terminal $\phi 1$ via the inverter IN2 and is released from reset when the output level of the output terminal $\phi 1$ becomes high. After being released from the reset, peak detection circuit PCD detects and holds the peak value of signals produced from the photo-sensors PT1–PT7 one after another. The comparator CMP2 receives signals produced from the photosensors PT1–PT7 at its non-inversion input terminal. It receives, at its inversion input terminal, a peak value signal held at the peak detection circuit PCD before receipt of the signals at its non-inversion input terminal. The comparator CMP2 compares the two inputs thus received. Furthermore, the peak detection circuit PCD produces the peak value signal after the lapse of a predetermined length of time from receipt of input signals. A reference symbol LT identifies a rise synchronizing D type latching circuit. When the output level of an AND gate AN7 which has the output terminal of the comparator CMP2 and that of an OR gate OR4 connected thereto becomes high, the latching circuit LT stores a count value of the counter CNT. The latching circuit LT designates a sensor that produces the largest signal in conjunction with the peak detection circuit PCD and the comparator CMP2. When any of the outputs of the photo-sensors PT1–PT7 exceeds the reference voltage RF, the comparator CMP1 produces a high level output indicating that the photo-sensors PT1–PT7 have reached a detectable range. When the output terminal of the comparator CMP1 changes to a high level, a one-shot circuit ONS produces a one-shot pulse to reset the counter CNT via the OR gate OR3. The RS flip-flop RSF is arranged to be reset when the output level of the inverter IN2 become high and is set when the output level of the comparator CMP1 becomes high. The output terminal Q of the flip-flop RSF is connected to an OR gate OR4 and to the AND gate AG8. The output terminal $\overline{Q}$ of the flip-flop RSF is connected to an AND gate AN6. When the level of the output $\overline{Q}$ of the flip-flop RSF is high, the AND gate AN6 allows clock pulses from the output terminal $\phi 2$ of the pulse control circuit CKT to be supplied to the OR gate OR4. When the output level of the OR gate OR4 is low, the AND gates AN0, AN2 and AN4 receive a high level signal from the inverter IN1. Then, signals produced from output terminals E0, E1 and E2 of the latching circuit LT are supplied to the decoder DCD through the OR gates OR0, OR1 and OR2. As a result, some of the gates AG1-AG7 that correspond to the count output of the counter CNT held at the latching circuit LT open. When the output level of the OR gate OR4 is high, the count signals from the counter CNT are supplied to the decoder DCD via the AND gates AN1, AN3 and AN5 as mentioned in the foregoing. Then, the gates AG1-AG7 open, one after another, according to the signals of the counter CNT. There is provided the signal processing circuit PCK which receives and processes the signals of the photo-sensors PT1-PT7 when the level of the output Q of the RS flip-flop RSF becomes high opening the gate AG8.

Figure 10:
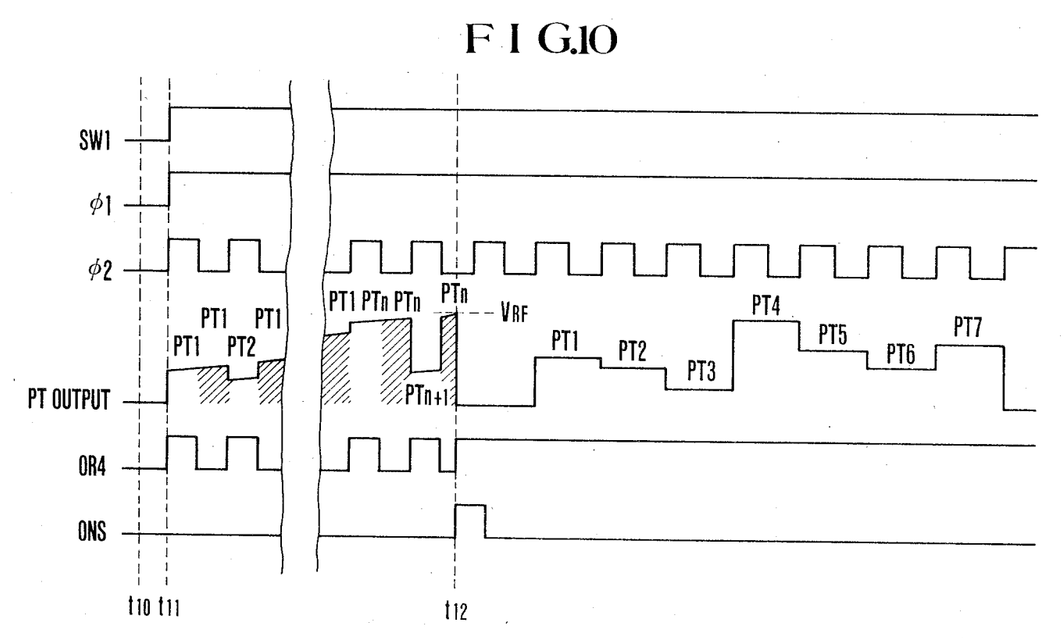
FIG. 10 is a timing chart showing the operation of the embodiment shown in FIG. 9.

FIG. 10 is a timing chart showing the operations of the essential parts of the circuit arrangement shown in FIG. 9. Referring to FIG. 10, the embodiment shown in FIG. 9 operates as follows: At a time t10, the output $\phi1$ of the pulse control circuit CKT level is low while the output level of the SIT driving circuit DV has also become low. Therefore, unnecessary light (picture image) information stored at the photo-sensors PT1-PT7 of the SIT structure has been cleared. Meanwhile, the counter CNT, the RS flip-flop RSF and the peak value detection circuit PCD have also been reset. When the switch SW1 turns on at a time t11, the output terminal $\phi1$ level of the pulse control circuit CKT changes to a high level. Then, the driving circuit DV output level becomes high causing the photo-sensors PT1-PT7 to store the light information. Meanwhile, with the switch SW1 closed, the output terminal $\phi2$ of the pulse control circuit CKT begins to produce clock pulses. In synchronization with the rise of the clock pulses, the gate AG1 opens through the counter CNT, the AND gates AN1, AN3 and AN5, the OR gates OR0-OR2 and the decoder driver DCD. With the gate AG1 open, the signal of the photo-sensor PT1 is first read out. At that time, a terminal S of the RS flip-flop RSF has not as yet received any signal. Therefore, the output $\overline{Q}$ of the flip-flop RSF has a high. Therefore, a high level level signal of the first of the clock pulses from the output terminal $\phi2$ of the pulse control circuit CKT is supplied to one of the terminals of each of the AND gates AN1, AN3 and AN5 through the AND gate AN6 and the OR gate OR4. Therefore, the above-stated signals from the counter CNT pass the AND gates AN1, AN3 and AN5 in synchronization with the clock pulses.

The signal from the photo-sensor PT1 is supplied to the non-inversion input terminal of the comparator CMP2 and is detected and held as a peak value at the peak value detection circuit PCD which has been reset. This peak value is then applied to the inversion input terminal of the comparator CMP2. However, since there is a delay in the operation of the peak value detection circuit PCD, the comparator CMP2 first receives a signal only at its non-inversion input terminal. Therefore, at that moment, the comparator CMP2 produces a high level signal. This high level signal produced from the comparator CMP2 is supplied to one of the input terminals of the AND gate AN7. Meanwhile, the high level portion of the first of the clock pulses from the output terminal $\phi2$ of the pulse control circuit CKT is supplied to the other input terminal of the AND gate AN7. Therefore, the output terminal of the AND gate AN7 at that time produces a high level signal, which is then supplied to a terminal M of the latching circuit LT. This renders the latching circuit LT operative and it holds a count value for the first pulse produced from the output terminal $\phi2$ of the pulse control circuit CKT, i.e. the signal of the counter CNT which is opening the gate AG1. Then, when the first clock pulse of the output terminal $\phi2$ becomes low level, the AND gate AN6 output level becomes low and then, since the output Q level of the flip-flop RSF is also low, the OR output level gate OR4 becomes low. As a result, the level of one of the input terminals of each of the AND gates AN1, AN3 and AN5 becomes low. The signals of the counter CNT are no longer supplied to the decoder DCD. Meanwhile, since the output terminal of the inverter IN1 output level changes to a high level, the level of one of the input terminals of each of the AND gates AN0, AN2 and AN4 becomes high. This allows the count value of the counter CNT which has been held at the latching circuit LT to be supplied to the decoder DCD. Then, the gate AG1 is again opened allowing the signal of the photo-sensor PT1 to be produced therethrough. Generally, in this instance, the signal thus produced from the photo-sensor PT1 becomes larger than the peak value of the photo-sensor PT1 which has been detected and held by the peak detection circuit PCD when the clock pulse of the output terminal $\phi2$ of the pulse control circuit CKT is at a high level because of a longer storage time. Therefore, the greatest value of the signal produced from the photo-sensor PT1 is detected and held as a new peak value at the peak detection circuit PCD. At this time, since the output level of the OR gate OR4 is low, the signal produced from the comparator CMP2 is stopped at the AND gate AN7. Therefore, the latching circuit LT remains unaffected by the signal from the comparator CMP2 whatever the condition of the signal. The latching circuit LT thus keeps the count value of the counter CNT, which has been held there when the clock pulse of the output terminal $\phi2$ has been at a high level state.

When the second clock pulse of the output terminal $\phi2$ of the pulse control circuit CKT reaches a high level, the signal of the counter CNT this time opens the gate AG2 reading out the signal of the photo-sensor PT2 in the same manner as the first high level pulse. The signal from the photo-sensor PT2 is supplied to the non-inversion input terminal of the comparator CMP2. The comparator CMP2 compares it with the peak value which has been detected and held at the peak value detection circuit PCD. If the signal value from the photo-sensor PT2 is smaller than the output value of the peak value detection circuit PCD, the output level of the comparator CMP2 is low allowing the peak value detection circuit PCD to keep the same peak value signal. However, if the output value of the photo-sensor PT2 is larger than the output value of the peak value detection circuit PCD, the output level of the comparator CMP2 becomes high. Then, the count value of the counter CNT, which is obtained for the second pulse, is newly kept at the latching circuit LT in the same manner as the high level of the first of the clock pulses produced from the output terminal $\phi2$ of the pulse control circuit CKT. Meanwhile, the peak output value of the photo-sensor PT2 is newly kept at the peak value detection circuit PCD. When the second of the clock pulses from the output terminal $\phi2$ becomes low, either the gate AG1 or the gate AG2 is opened either by the count value obtained by counting the first pulse or by the count value obtained by counting the second pulse. Then, the peak value of either the output of the photo-sensor PT1 or that of the photo-sensor PT2 is detected and held at the peak detection circuit PCD. The signal from the comparator CMP on the other hand leaves the latching circuit LT unaffected thereby as the AND gate AN7 is closed. The latching circuit LT, therefore, retains the count value of the counter CNT as it is.

Then, the signals of the photo-sensors PT3, PT4, PT5, - - - and PTn are compared, one after another. In the meantime, the non-inversion input terminal of the comparator CMP1 always receives the largest of the photo-sensors PT1-PT7 outputs. Then, when the largest photo-sensor output exceeds the reference voltage RF at a time t12, the comparator CMP1 changes to a high output level. The RS flip-flop RSF is set thereby. A one-shot pulse is produced via a one-shot circuit ONS. As a result, the counter CNT is reset. With the RS flip-flop RSF set, the level of one input terminal of the AND gate AN6 becomes low while that of one input terminal of the OR gate OR4 becomes high. Then, the output level of the OR gate OR4 becomes high irrespective of the clock pulses $\phi 2$, opening the AND gates AN1, AN3 and AN5 and closing the AND gates AN0, AN2 and AN4. Furthermore, the gate AG8 opens when the RS flip-flop RSF is set. Then, the outputs of the photo-sensors PT1-PT7 are read in by the signal processing circuit PCK, one after another depending on the output of the counter CNT.

Furthermore, if the output level of the photo-sensors PT1-PT7 is set at a suitable voltage level based on the output of the comparator CMP1 which produces a signal indicating that the output of the photo-sensors has reached a prescribed value in such a way as to stop storage of the light information, the signal amount stored at each of the photo-sensors PT1-PT7 at that time can be accurately detected.

In the embodiment described above, the value to be compared with the reference voltage RF may be either the largest or smallest output value of the photo-sensors PT1-PT7.

In each of the embodiments, the signal processing circuit PCK may be replaced, for example, with a distance detection circuit which detects the distance to an object by reading out the outputs of the photo-sensors PT1-PT7, one after another. In those circumstances, two sets of photo-sensors PT1-PT7 may be in two rows and light from the object may be guided to them, for example, through a distance measuring optical system or the photo-taking optical system of a camera. Furthermore, the present invention is also applicable to a system such as a video camera tube that detects an image by arranging rows of photo-sensors PT1-PT7 in parallel in a plurality of arrays.

In accordance with the invention, the storage type photo-sensor which permits nondestructive read-out is not limited to the use of the SIT structure which has been described in the foregoing, but may be selected from various modifications. Conceivable modifications relative to the photo-sensor, for example, include a sensor disclosed in a Japanese Laid-Open Patent Application No. SHO 56-157073 (laid-open date for public inspection: Dec. 4, 1981); and examples described in IEEE, ED 1975 ED-22, P 185 and "TELEVISION GAKKAI, GIJUTSU HOKOKU ED 590, " (dated Aug. 28, 1981).

In the photodetecting device having at least one storage type photo-sensor according to the present invention, the storage time of the storage type photo-sensor can be accurately determined within a short period of time; and the brightness of light incident upon the storage type photo-sensor can be detected with an extremely simple structural arrangement as described in the foregoing.

Furthermore, in accordance with the invention, a photo-sensor with the greatest output can be selected from a plurality of storage type photo-sensors. Therefore, an optimum storage time can be determined in a short period of time even where only one detecting means for determining the storage time is provided for a plurality of storage type photo-sensors.

What we claim:

1. A photo-detecting device comprising:
   (a) photo-detecting means including a storage type photo-sensor arranged to produce information stored therein according to light inputs in the form of signals integrated in a real time and nondestructive manner;
   (b) driving means for driving said photo-detecting means to begin to store information according to incident light;
   (c) comparing means for comparing the storage information of said photo-detecting means with reference information, said comparing means being arranged to produce a signal for reading out storage information from said photo-detecting means when said photo-detecting means stores a predetermined amount of information after the beginning of storing by said photo-detecting means; and
   (d) switching means operatively connected to said photo-detecting means and arranged to permit reading out of the stored information of said photo-detecting means according to the signal from said comparing means.

2. A device according to claim 1, further including:
   (e) flashing means having a flashing source and means for stopping the flashing light source and arranged to stop flashing in response to the signal produced from said comparing means.

3. A device according to claim 1, wherein said photo-detecting means is provided with a plurality of storage type photo-sensor for producing a plurality of storage information values.

4. A device according to claim 3, further including:
   (f) weighting means for weighting the plurality of storage information values produced from said photo-detecting means, said weighting means being provided between said photo-detecting means and said comparing means.

5. A device according to claim 3, wherein said comparing means is arranged to simultaneously compare at least two of the storage information values of said photo-detecting means with said predetermined amount of information.

6. A device according to claim 3, further including:
   (g) operating means connected operatively with said photo-detecting means for permitting selection of one of the plurality of storage information values of said photo-detecting means.

7. A photo-detecting device comprising:
   (a) photo-detecting means including a storage type multi-photo-sensor which produces a plurality of output signals each being integrated in a real time and nondestructive manner;
   (b) control means for driving said photo-detecting means to integrate for storing information according to incident light and reading out of the stored information of said photo-detecting means so as to provide said each output signal in a serial manner;

(c) said control means having means for comparing any one of said output signals with reference information, said comparing means being stored to produce a control signal for reading out storage information when said photo-detecting means stores a predetermined amount of information.

8. A photo-detecting device comprising:

(a) photo-detecting means including a storage type multi-photo-sensor which produces a plurality of output signals each being integrated in a real time and nondestructive manner;

(b) control means for driving said photo-detecting means to integrate for storing information according to incident light and reading out of the stored information of said photo-detecting means so as to provide said each output signal in a serial manner;

(c) said control means having means for comparing one of said output signals with other output signals during the integration when said one of the output signals reaches a predetermined value, said comparing means being arranged to produce a control signal for reading out stored information when at least one of said output signals produced from said multi-photo-sensor reaches a predetermined amount.

* * * * *